United States Patent [19]

Lasar

[11] 4,275,266
[45] Jun. 23, 1981

[54] DEVICE TO CONTROL MACHINES BY VOICE

[76] Inventor: Theodore Lasar, 40 First Ave., New York, N.Y. 10009

[21] Appl. No.: 23,638

[22] Filed: Mar. 26, 1979

[51] Int. Cl.³ .......................................... H04M 1/19
[52] U.S. Cl. .................................. 179/1 VC; 340/148
[58] Field of Search ............ 179/1 VC, 1 SW, 1 SD, 179/1 SE, 1 SB, 100.1 VC; 340/148, 146.3 WD; 307/116; 358/194; 325/392, 395; 455/352

[56] References Cited

U.S. PATENT DOCUMENTS

| | | | |
|---|---|---|---|
| 3,742,143 | 6/1973 | Awipi | 179/1 VC |
| 4,197,524 | 4/1980 | Salem | 340/148 |

OTHER PUBLICATIONS

Newell et al., "Voice Operated Powered Devices", Mechanical Engineering, vol. 92, No. 11, Nov. 1970, pp. 25–27.

Primary Examiner—Joseph A. Popek
Attorney, Agent, or Firm—S. C. Yuter

[57] ABSTRACT

A device to control machines by voice is disclosed which responds to a plurality of predetermined musical tones in a sequence to generate a digital control output signal. Audio conversion means convert the sequence of tones into a corresponding sequence of digital number signals which are temporarily stored in a memory. Then a sequence of ratio signals are generated by dividing each of the digital number signals by one of the digital number signals. The resulting sequence of ratio signals is then converted into a corresponding sequence of digital numbers which comprises the digital control output signal. A microprocessor and associated storage processes the digital data and controls the conversion of the musical tones into corresponding digital numbers.

10 Claims, 4 Drawing Figures

| TUNE COMMAND F1 F2 F3 F4 | RATIOS F2/F1 | F3/F1 | F4/F1 | INTERMEDIATE CODE | BINARY OUTPUT |
|---|---|---|---|---|---|
| DO DO DO DO | 1 | 1 | 1 | 1 0 1 0 1 0 | 0 0 0 0 |
| DO DO DO FA | 1 | 1 | 4/3 | 1 0 1 0 1 1 | 0 0 0 1 |
| DO DO FA DO | 1 | 4/3 | 1 | 1 0 1 1 1 0 | 0 0 1 0 |
| DO DO FA FA | 1 | 4/3 | 4/3 | 1 0 1 1 1 1 | 0 0 1 1 |
| DO FA DO DO | 4/3 | 1 | 1 | 1 1 1 0 1 0 | 0 1 0 0 |
| DO FA DO FA | 4/3 | 1 | 4/3 | 1 1 1 0 1 1 | 0 1 0 1 |
| DO FA FA DO | 4/3 | 4/3 | 1 | 1 1 1 1 1 0 | 0 1 1 0 |
| DO FA FA FA | 4/3 | 4/3 | 4/3 | 1 1 1 1 1 1 | 0 1 1 1 |
| FA DO DO DO | 3/4 | 3/4 | 3/4 | 0 1 0 1 0 1 | 1 0 0 0 |
| FA DO DO FA | 3/4 | 3/4 | 1 | 0 1 0 1 1 0 | 1 0 0 1 |

DEVICE TO CONTROL MACHINES BY VOICE

SUMMARY OF INVENTION

This invention relates to an electronic device that enables persons who can make musical sounds with their voices or by whistling, or by means of musical instruments, to control machines with these sounds.

Control of machines by voice is a developing art and a strong need is felt in society for devices to make this control possible. Machines are commercially available that will respond selectively to the utterance of specific words. These machines have a common fault. They must be programmed in advance by the person who gives the commands. They will not respond correctly when another person gives the same commands.

This drawback can be overcome by recognizing that there are sounds that many different persons can make that a properly designed machine will recognize and respond to consistently. They are musical sounds.

The audio frequencies that constitute the scale of musical notes are always in the same well known ratios which are the quotients of whole numbers such as 3/2, 4/3 etc. If there is even a small departure from these ratios, the notes sound "sour" and produce an unpleasant effect. A large percentage of the human population can produce notes that are "in tune" and are therefore very close to the correct mathematical ratios.

Thus, anyone who hums, whistles or sings the first few notes of a tune "in key" automatically produces a definite mathematical statement which consists of the ratios of the audio frequencies in some systematic order. It makes no difference upon what particular frequency the tune is started. The same tune always gives the same ratios.

The general object of this invention is to provide a device that will enable persons who can produce musical notes by humming, singing or whistling, or by playing an instrument, to give commands to machines by producing the notes of different tunes, each tune producing a different, pre-arranged effect.

Another object of the invention is to provide a voice control or command device that can be used by many different persons without the need for pre-programming to match the response of the device to any particular person.

Another object of the invention is to provide a voice control device that will be highly immune to false signals.

Another object of the invention is to provide a voice control device that is low in cost to produce.

These and other objects of the invention are achieved by an electronic device comprising a microphone and amplifier. The person giving the command produces in succession the first few notes of a tune. The microphone converts the sounds to electrical vibrations which are fed into a binary counter for a fixed interval of time. Thus the counter contains, for each note, a binary number proportional to the frequency of the note.

As notes are produced in succession, the counter is cleared and enabled to receive each note. As each frequency is registered in the counter it is transferred by the action of a microprocessor into a memory register.

After a pre-arranged number of notes, the microprocessor performs arithmetic division upon the stored number in a systematic order, and the quotients are stored in memory registers.

After the quotients are all computed, the microprocessor uses these quotients in systematic order to find the output command with which they are associated.

A significant advantage of this invention is the fact that it has many uses. It can be used to create an automatic telephone system in which users "dial" other users by humming, whistling or singing tunes into a simple telephone. It can be used to create control systems for disabled persons so that they can open doors, or turn on lights, etc. with their voices. It can be used to create control systems for automobiles so that drivers can turn on or off radios, lights, etc., without having to grope for switches or risk looking away from the road. It can be used in hospitals to enable doctors to control life support systems in emergencies without having to leave the patient. It can be used to create entertaining toys and games that users control with their voices.

These and other advantages of the invention will be apparent from the following detailed description and specification of the invention made in connection with the accompanying drawings.

FIGURES OF THE DRAWING

FIG. 1 is a table showing a particular example of a code which will be used to explain the operation of the device. The first column shows the four note "tune commands" which, in this case utilize only two notes of the musical scale, the first and fourth. They are designated by "do" and "fa" in accordance with accepted musical practice. The last column shows the output binary number each command is expected to produce. It will be observed that the tune commands closely resemble the output binary numbers which is a valuable mnemonic device, enabling persons to produce binary numbers by visualizing the note combinations as binary numbers. The second column shows the frequency ratios between the first and other notes in systematic order. The third column shows an intermediate code whose use becomes apparent in the explanation below.

DETAILED DESCRIPTION AND SPECIFICATION OF THE INVENTION

Figures 1, 2:
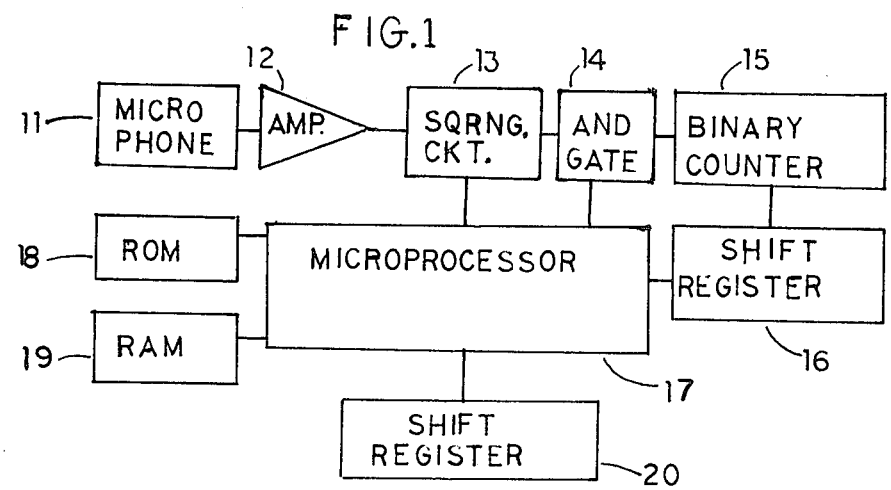
FIG. 2 is a block diagram of the complete electronic device composed of standard commercial parts.
Figure 3:
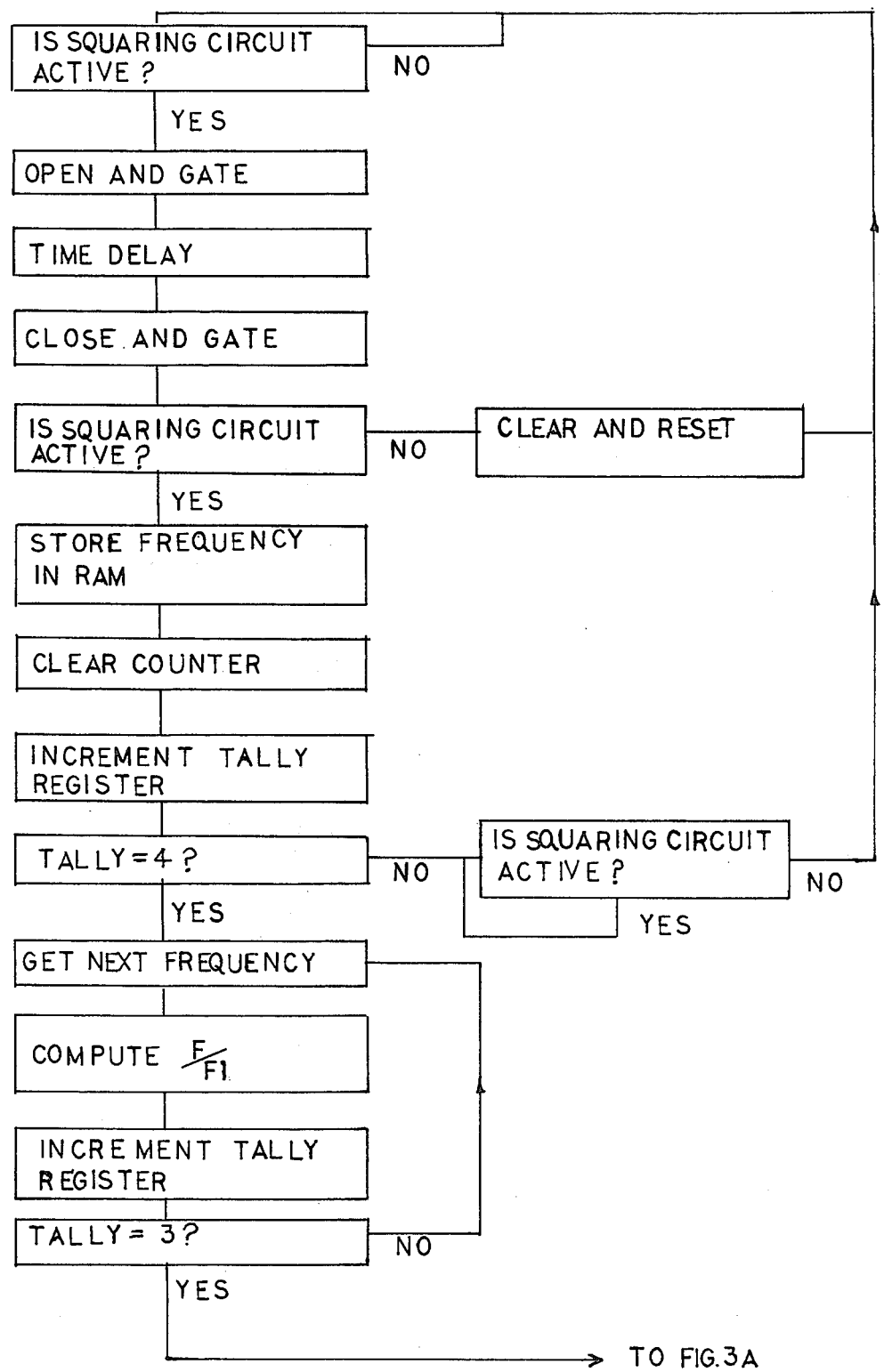
FIG. 3 shows the algorithm of the program stored in the read-only memory, ROM (18), of FIG. 2.
Figure 3A:
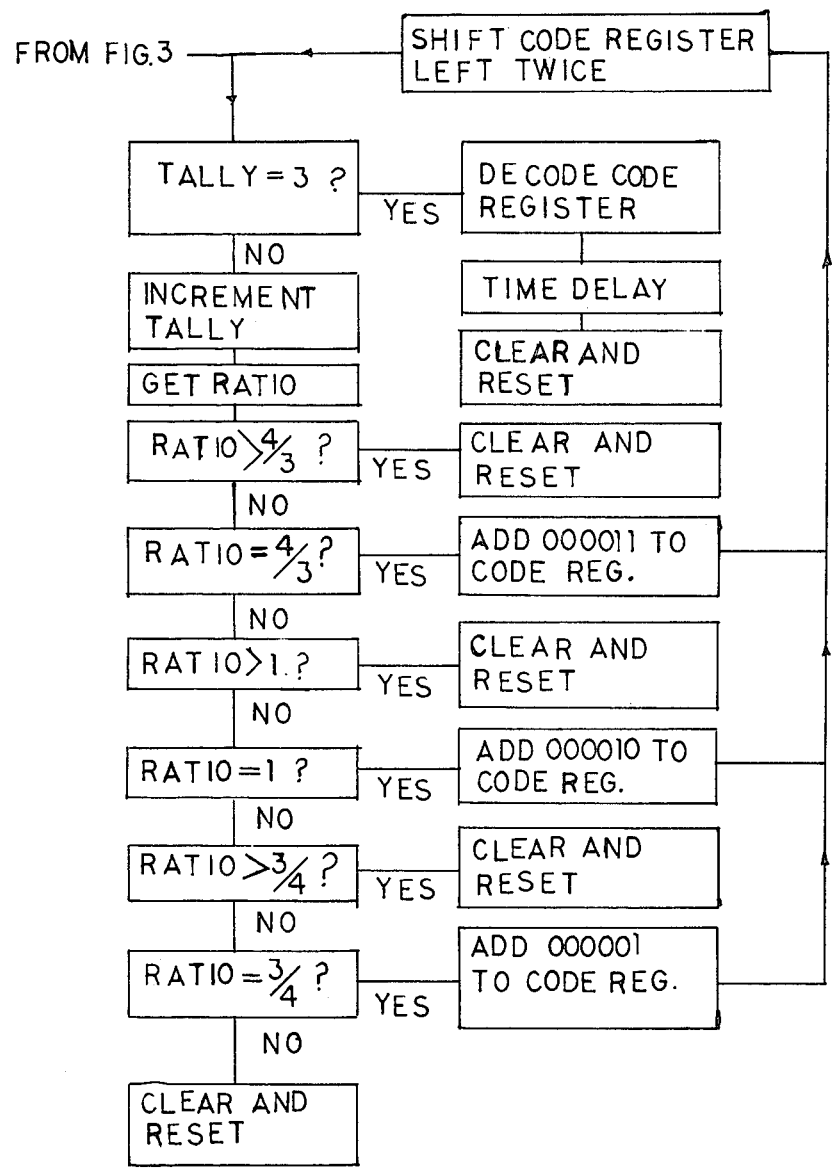
FIG. 3A is a continuation of FIG. 3.

Referring to the voice control device shown in FIGS. 1–3, a person using the device wishes to obtain a particular binary number output as shown in the last column of FIG. 1 by producing a particular tune as shown in the first column of FIG. 1. The notes must be produced in accordance with the following rules:

1. Each note must persist for at least 0.5 seconds.
2. The notes must be separated by a brief interval of silence.

Referring to FIG. 2, the sound vibrations of the first note are picked up by microphone 11 and converted to electrical vibrations. The electrical vibrations are amplified by amplifier 12 and then converted into square waves by squaring circuit (schmidt trigger) 13. The purpose of this conversion is to insure that the counter 15 receives fast rise signals in order to respond.

Microprocessor 17 operates under the control of a program stored in ROM (read-only-memory) 18. When the first note is received by the squaring circuit 13, the microprocessor is at the start of its program in which it is repeatedly testing the squaring circuit to determine if it is active and receiving a signal.

When a signal is sensed, the microprocessor 17 sends a signal to the gate 14 causing the gate to open and allowing the frequency signal to pass into binary counter 15. The counter starts from zero and counts the pulses of the frequency.

After a fixed time delay, the microprocessor 17 closes the gate 14 and pulses cease to be counted up in counter 15. The counter 15 now contains a binary number proportional to the frequency of the first note of the command. The microprocessor 17 now tests the squaring circuit 13 to determine if it is active. If it is active the note is known not to have ended prematurely and that therefore the contents of the counter 15 truly represent the frequency of the note. The contents of the counter are transferred into shift register 16 after which they are transferred into a register in RAM 19 for storage. If the squaring circuit 13 is found not to be active, all registers are reset and a return is made to the beginning of the program.

After the first note is stored, the counter 15 is cleared ready for the second note. A tally register is incremented by one in order to keep count of the notes and the tally is checked to see if it is equal to four. If not, the squaring circuit is tested to see if it is active. If it is not active, the program returns to the start for the second note.

After four notes have been received and stored, the tally indicates four and the program moves to the next loop.

In the next loop the second frequency is selected by the microprocessor 17 and arithmetic division by the first frequency is performed. The result is stored in a memory register in RAM 19 and a tally register in RAM 19 is incremented and tested for equality to three. If not, the program selects the third frequency and arithmetic division by the first frequency is performed and the result stored in a register in RAM 19.

When three ratios have thus been computed and stored and the tally register indicates three, the program moves to the next loop.

In the last loop, the ratios are decoded. First a tally is tested to see if it is equal to three. If not, the first ratio is selected and tested for value. If it is not, within a predetermined percentage, equal to one of the three standard ratios, all registers are cleared and the program returns to the beginning. If it is found to be one of the standard ratios, the intermediate code corresponding to that ratio is added to the intermediate code register. After each addition, the register is shifted to the left two places to make room for the next ratio.

In this way, after three successive additions, the intermediate code register in RAM 19 contains the complete intermediate code for one of the output binary numbers as determined in the table in FIG. 1.

On the last circuit of the loop, the tally register indicates three. The contents of the intermediate code register are used as an address to look up the output binary code. The look-up table is stored in ROM 18. The output binary number is fed into shift register 20. Thus the output command is now available for use externally and the objective of the invention is achieved.

After a time delay, all registers are cleared and the program returns to the beginning for the next command.

What is claimed is:

1. A voice control system responsive to a sequence of predetermined different audio frequency signals to generate a digital control output signal comprising:
   (a) audio conversion means responsive to a predetermined audio frequency signal for generating a digital number signal proportional to the audio frequency;
   (b) storage means for storing predetermined program data and also for temporarily storing data including each of a sequence of digital number signals generated by said audio conversion means;
   (c) output signal memory means for storing digital control output signals; and
   (d) data processing means coupled to each of said audio conversion means, storage means and output signal memory means for transferring signals and controlling the system in response to said predetermined program data stored in said storage means, said predetermined program data including
      (1) a ratio generation routine for generating a sequence of ratio number signals by dividing each of the stored sequence of digital number signals by one of the digital number signals, and
      (2) a ratio number conversion routine for converting a sequence of stored ratio number signals into a digital control output signal for storage in said output signal memory means.

2. A voice control system according to claim 1 wherein said ratio number conversion routine comprises an intermediate code generating routine for generating intermediate code signals in response to ratio number signals, and a digital control output signal conversion routine for converting intermediate code signals into digital control output signals.

3. A voice control system according to claim 2 wherein said data processing means comprises a microprocessor and a read only memory for storing both said predetermined program data and look-up table data for converting intermediate code signals into digital control output signals.

4. A voice control system according to claim 1 wherein said audio conversion means comprises gating means under control of said data processing means for limiting the time of response to a predetermined audio frequency signal.

5. A voice control system according to claim 4 wherein said data processing means tests said audio conversion means to determine that the audio frequency signal did not terminate prematurely.

6. A voice control system according to claim 5 wherein said audio conversion means also includes binary counter means responsive to gated signals from said gating means for generating digital number signals proportional to the frequency of the audio frequency signal.

7. A voice control system according to claim 1 wherein the predetermined different audio frequency signals comprise two different musical tones.

8. A voice control system according to claim 7 wherein ratio number signals generated by said ratio generation routine are generated by dividing each of the stored digital number signals of the sequence generated by said audio conversion means by the number signal of the first of the sequence.

9. A voice control system according to claim 8 wherein the sequence of digital number signals is four in number and the sequence of stored ratio number signals is three in number.

10. In a data processing and storage system, a voice control method responsive to a sequence of predetermined audio frequency signals to generate a digital control output signal comprising the steps of:
 (a) converting a predetermined audio frequency signal into a digital number signal proportional to the audio frequency;
 (b) dividing each of a sequence of digital number signals by one of the digital numbers for generating a sequence of ratio number signals; and
 (c) converting a sequence of ratio number signals into a digital control output signal and storing the digital control output signal.

* * * * *